(12) United States Patent
Haines et al.

(10) Patent No.: US 8,200,869 B2
(45) Date of Patent: Jun. 12, 2012

(54) STORAGE SYSTEM WITH ALTERABLE BACKGROUND BEHAVIORS

(75) Inventors: Jonathan W. Haines, Boulder, CO (US); EweChye Tan, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1502 days.

(21) Appl. No.: 11/348,636

(22) Filed: Feb. 7, 2006

(65) Prior Publication Data

US 2007/0198803 A1    Aug. 23, 2007

(51) Int. Cl.
*G06F 13/00* (2006.01)
(52) U.S. Cl. .......................................... 710/74; 710/15
(58) Field of Classification Search ................. 710/8
See application file for complete search history.

(56) References Cited

U.S. PATENT DOCUMENTS

| | | | |
|---|---|---|---|
| 4,656,599 A | 4/1987 | Knothe et al. |
| 4,742,413 A | 5/1988 | Schewe |
| 5,044,378 A | 9/1991 | Toma et al. |
| 5,067,443 A | 11/1991 | Hurnik et al. |
| 5,481,983 A | 1/1996 | Guzman et al. |
| 5,652,442 A | 7/1997 | Roks |
| 5,659,457 A | 8/1997 | Lian et al. |
| 5,940,621 A | 8/1999 | Caldwell |
| 6,002,866 A | 12/1999 | Fuller |
| 6,032,161 A | 2/2000 | Fuller |
| 6,055,526 A | 4/2000 | Ambroziak |
| 6,072,717 A | 6/2000 | Brug et al. |
| 6,205,051 B1 | 3/2001 | Brug et al. |
| 6,297,500 B1 | 10/2001 | Franzen et al. |
| 6,324,627 B1 | 11/2001 | Kricheff et al. |
| 6,330,640 B1 | 12/2001 | Williams et al. |
| 6,366,980 B1 | 4/2002 | Haines et al. |
| 6,369,968 B1 | 4/2002 | Haines et al. |
| 6,385,721 B1 | 5/2002 | Puckette |
| 6,480,932 B1 | 11/2002 | Vallis et al. |
| 6,496,313 B1 | 12/2002 | Haines et al. |
| 6,513,052 B1 | 1/2003 | Binder |
| 6,557,014 B1 | 4/2003 | Cellis et al. |
| 6,600,614 B2 | 7/2003 | Lenny et al. |
| 6,621,652 B2 | 9/2003 | Haines et al. |
| 6,650,492 B2 | 11/2003 | Lenny et al. |
| 6,687,849 B1 | 2/2004 | Cherf |
| 6,732,171 B2 | 5/2004 | Hayden |
| 6,751,037 B1 | 6/2004 | Haines et al. |
| 6,757,781 B2 | 6/2004 | Williams et al. |
| 6,769,022 B1 | 7/2004 | DeKoning et al. |
| 6,941,419 B2 | 9/2005 | Haines et al. |
| 6,944,712 B2 | 9/2005 | Weber et al. |

(Continued)

OTHER PUBLICATIONS

Symantec, Norton PartitionMagic 8.0 User's Guide, 2004, Symantec, pp. 1-159.*
American Heritage Dictionary, 1982, Houghton Mifflin Company, p. 989.*

*Primary Examiner* — Cheng-Yuan Tseng
(74) *Attorney, Agent, or Firm* — Hall Estill Attorneys at Law

(57) ABSTRACT

A method and apparatus associated with circuitry configured to perform a selected one of a plurality of different data integrity operations on stored data in relation to a manner in which the data are to be retrieved. In some embodiments a data storage device is partitioned into a plurality of partitions, and one of a plurality of different data integrity operations is performed on stored data in relation to which partition of the plurality of partitions the stored data is in.

6 Claims, 4 Drawing Sheets

U.S. PATENT DOCUMENTS

| | | |
|---|---|---|
| 2002/0036850 A1 | 3/2002 | Lenny et al. |
| 2002/0060868 A1 | 5/2002 | Lenny et al. |
| 2002/0108016 A1 | 8/2002 | Haines et al. |
| 2005/0021501 A1* | 1/2005 | Butron .............................. 707/2 |
| 2006/0075289 A1* | 4/2006 | Forrer et al. ...................... 714/6 |
| 2007/0168754 A1* | 7/2007 | Zohar et al. ..................... 714/42 |

* cited by examiner

190

| TRACK 0 | ALLOCATED |
| TRACK 1 | ALLOCATED |
| TRACK 2 | ALLOCATED |
| TRACK 3 | UNALLOCATED |
| TRACK 4 | UNALLOCATED |

| TRACK 0 | ALLOCATED |
| TRACK 1 | ALLOCATED |
| TRACK 2 | HOLES – NOT SAFE TO WRITE |
| TRACK 3 | ALLOCATED |
| TRACK 4 | UNALLOCATED |

| TRACK 0 | ALLOCATED |
| TRACK 1 | ALLOCATED |
| TRACK 2 | ALLOCATED |
| TRACK 3 | HOLES – READY FOR WRITE |
| TRACK 4 | UNALLOCATED |

FIG. 8

STORAGE SYSTEM WITH ALTERABLE BACKGROUND BEHAVIORS

FIELD OF THE INVENTION

The embodiments of the present invention relate generally to the field of data storage systems and more particularly, but without limitation, to an apparatus and associated method for altering the behavior of background data integrity operations on stored data in relation to how a remote device interacts with the stored data.

BACKGROUND

Data storage devices are used to access digital data in a fast and efficient manner. With the proliferation of data storage devices being employed in consumer electronics devices, it is now not unusual for a remote host to access different data within a data storage device in completely different ways. Generally, two types of data can be categorized as being either normal computer data or audio/visual (A/V) data.

Normal computer data is accessed in a more traditional way, whereby the content of the data itself is essential to successfully executing the computer processes, tracking the processes, and reporting results of the processes. For this reason, each bit of normal computer data is potentially critical to the operational flow of the computer process. Normal data is commonly referred to as "reliability-critical" type of data for this reason.

On the other hand, A/V data relates to computer readable information that when executed produces audio signals and/or video signals through a speaker or a monitor. The performance with which this type of a continuous stream of a large volume data can be read as a single command is fundamentally more important than its bit-by-bit accuracy. That is, if some of the audio/visual data is in error, the error can usually be passed on to the host without noticeable corruption of the audio/video signal, at least in comparison to the delays that would otherwise occur were the A/V data scrutinized the same as normal data. For this reason A/V data is commonly referred to as "time-critical" data.

It is becoming prevalent that the host must access both reliability-critical and time-critical data from a common storage space. Having both types of data stored in a common storage space not only makes host accesses problematic, but also creates challenges to the way the data storage device manages background data integrity operations in order to preserve the integrity of the data and access to it. What is needed is a straightforward way of altering the behavior by which the data integrity operations are performed in relation to how the host accesses the data. It is to these improvements that the embodiments of the present invention are directed.

SUMMARY OF THE INVENTION

Embodiments of the present invention are generally directed to an apparatus and associated methodology for selectively altering the behavior by which a data storage device performs background data integrity operations.

In some embodiments a method is provided comprising steps of partitioning a data storage space into a plurality of partitions, and performing one of a plurality of different data integrity operations on stored data in relation to which partition of the plurality of partitions the stored data is in.

In other embodiments an apparatus is provided comprising circuitry configured to perform a selected one of a plurality of different data integrity operations on stored data in relation to a manner in which the data are to be retrieved.

In other embodiments a data storage device is provided having a physical storage space and means for performing different data integrity operations in relation to respective types of stored data in the physical storage space.

These and various other features and advantages which characterize the claimed invention will become apparent upon reading the following detailed description and upon reviewing the associated drawings.

BRIEF DESCRIPTION OF THE DRAWINGS

FIGS. 6-8 are diagrammatic views of a scrubbing operation on data stored in the overlapping tracks of FIG. 4 and subsequently updated.

DETAILED DESCRIPTION

Figure 1:
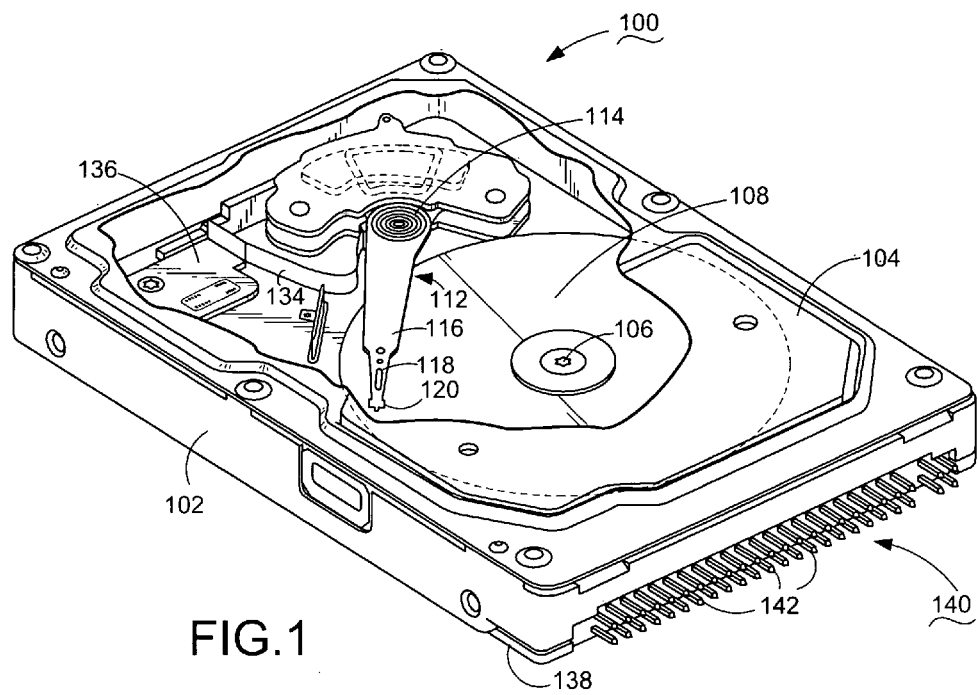
FIG. 1 is an isometric view of a data storage device constructed in accordance with embodiments of the present invention.

Referring to the drawings in general, and more particularly to FIG. 1 that shows an isometric view of a data storage device 100 constructed in accordance with embodiments of the present invention. The device 100 preferably includes a base 102 and a cover 104 (partially cutaway), which together provide a housing for a number of components. The components include a motor 106 to which one or more data storage mediums 108 are mounted for rotation therewith. Adjacent the medium 108 is an actuator assembly 112 that pivots around a bearing assembly 114. The actuator assembly 112 includes an actuator arm 116 supporting a load arm 118 that, in turn, supports a head 120 in a data transfer relationship with the adjacent medium 108. Each medium 108 can be divided into data tracks, and the head 120 is positioned to retrieve data from and store data to the tracks.

To provide the requisite electrical conduction paths between the head 120 and device 100 control circuitry, head wires can be routed on the actuator assembly 112 from the head 120, along the load arm assembly 118 and the actuator arm 116, and to a flex circuit 134. The head wires are thus connected to one end of the flex circuit 134 and the other end is connected to a flex circuit bracket 136. There the electrical connections pass through the base 102 to a printed circuit board (PCB) 138, which can be mounted externally to the enclosure. An electrical connector 140 attached to the PCB 138 has a plurality of contacts 142 for connecting the device 100 to a mating connector (not shown), such as for placing the device 100 in communication with external control circuitry.

Figure 2:
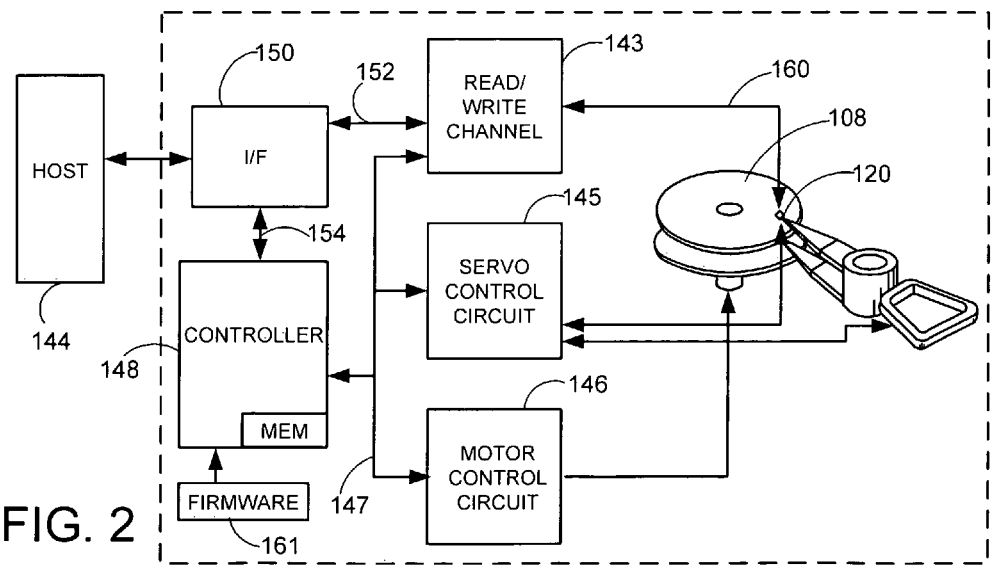
FIG. 2 is a functional block diagram of the data storage of FIG. 1 connected to a remote host device.

FIG. 2 is a functional block diagram illustrating types of control signals and data transfers that are passed between the device 100 and a remote device, such as the host 144 shown in the embodiments of FIG. 2. The device 100 generally has a read/write channel 143, a servo control circuit 145, and a motor control circuit 146, all connected by a control bus 147 to a controller 148. An interface circuit 150 is connected to the read/write channel 143 by bus 152 and to the controller 148 by bus. 154. The interface circuit 150 serves as a communications interface between the device 100 and the host device (or other remote device such as a network server) 144. Generally, in response to an access command from the host 144 and received by the controller 148 from the interface 150, the controller 148 controls the flow of data to and from the medium 108. The read/write channel 143, in turn, provides store and retrieve signals to the head 120 in order to store data to the medium 108 and retrieve data from the medium 108. The head 120 can, for example, provide an analog read signal 160 to the read/write channel 143, which in turn converts the analog read signal 160 to digital form 152 and performs the necessary decoding operations to provide data to the interface circuit 150 for output to the host 144.

Preferably, the data storage device can be configured as an audio visual ready (A/V-ready) drive. This requires that data stored on the data storage device be accessible by the host 144 in entirely different manners. That is, communications between the data storage device 100 and the host 144 can occur for access commands associated with reliability-critical data according to any of a number of standard protocols, such as the Advanced Technology Attachment/Advanced Technology Attachment Packet Interface (ATA/ATAPI) protocol. Clearly, in equivalent alternative embodiments this communication could occur over other protocols such as but not limited to Small Computer Systems Interface (SCSI), FibreChannel-Arbitrated Loop (FC-AL), Serial Storage Architecture (SSA), Compact-Flash, and the like.

For purposes of the present description and meaning of the appended claims, "reliability-critical data" means computer data such as is generally associated with normal user data that requires full error recovery because its content is formalistically critical to computer process mission accomplishment.

Although ATA compliant, the data storage device 100 can also be made AV-ready for data transfer commands associated with time-critical data. For purposes of the present description and meaning of the appended claims, "time-critical data" means computer data such as is generally associated with audio and/or visual data where commands must be completed within a specified time limit due to the streaming effects associated with transferring large chunks of the data. Errors that cannot be corrected within the time constraint can be transferred to the host and reported as such without significant loss of signal quality. The increased data transfer performance is accomplished by enabling relatively large command counts transferring large amounts of sectors with a single data transfer command, while adjusting the number of retries that would normally occur in relation to the associated time constraint.

Accordingly, embodiments of the present invention contemplate the controller 148 of the data storage device 100 being configured to perform a selected one of a plurality of different data integrity operations on stored data in relation to the manner in which the data are to be accessed by the host 144. In other words, the controller 148 can advantageously execute a different data integrity operation on time-critical data than it does on reliability-critical data. The different data integrity routines can be stored in firmware 161 and called by the controller 148 depending on the type of data in play.

Figure 3:
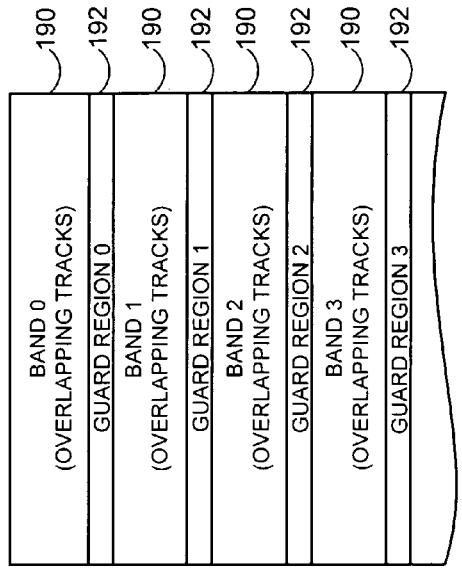
FIG. 3 is a diagrammatic view of the data storage medium of the data storage device of FIG. 1.

FIG. 3 is a diagrammatic illustration showing a way that the host 144 can differentiate the storage medium 108 into a plurality of partitions 170, 172. For purposes of illustration the host 144 can define the minimum and maximum logical block addresses bounding the partition 170 for storage of all reliability-critical, or normal, type data. Accordingly, any access command from the host 144 associated with a logical block address within the partition 170 will be recognizable to the controller 148 as being associated with reliability-critical data. Similarly, the host 144 can define the minimum and maximum logical block addresses bounding the partition 172 for storage of all time-critical, such as A/V, type data. Although not shown in FIG. 3, typically another partition will be defined for storing system boot data. For the ATA protocol, for example, the standard location for this information is the outer portion of the medium 108 such that the time-critical data partition 172 would be medially disposed between the normal data partition 170 and the boot data partition.

Data integrity operations performed on normal data are generally directed to minimizing the risk of failure of a data access command. To that end, for example, the industry has adopted the Self Monitoring Analysis & Reporting Technology (SMART) that observes and reports certain operating metrics of the data storage device in order to predict likelihood of such failures. Additionally, Drive Self-Tests (DST) are employed to supplement SMART data such as by shedding light on root cause determinations by the collection of critical event logs associated with the SMART metrics.

Figure 4:
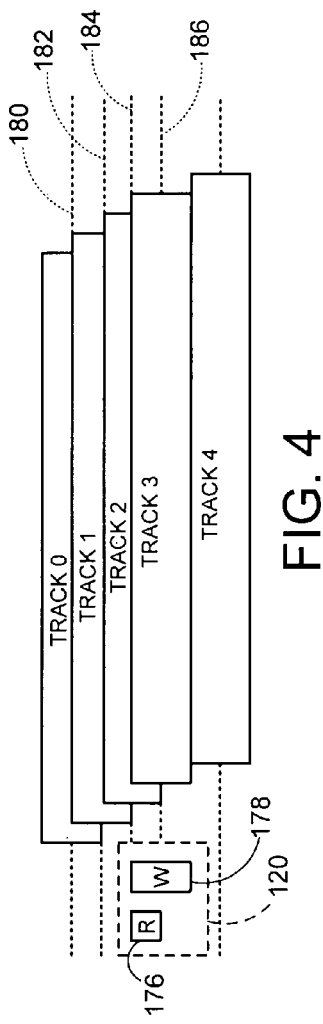
FIG. 4 is a diagrammatic view of a plurality of overlapping data storage tracks of the data storage medium of FIG. 3.

In contrast, data integrity operations performed on A/V streaming data are generally directed towards maintaining the stored data in a form suited for high-performance access. The storage density of streaming data can be increased by the use of overlapping data storage tracks that are encroached by the head 120 unidirectionally. FIG. 4 illustrates such an overlapping arrangement of the data storage tracks that can be written by the head 120 (FIG. 1) being constructed of a separate read element 176 and write element 178. Thus, the present embodiments contemplate selectively implementing categorically different types of data integrity operations, some types for verifying the content of reliability-critical data and other types for optimizing the stored format of time-critical data.

To write data, the head 120 is initially positioned so as to place the write element 178 in a substantially centered relationship over track centerline 180 and thereat writes Track 0. On a subsequent pass the head 120 is moved radially with respect to the medium 108 in order to place the write element 178 in a substantially centered relationship over track centerline 182 and thereat writes Track 1. It will be noted that Track 1 partially overlaps Track 0, but the non-overlapped portion of Track 0 is sufficiently wide to permit the read element 176 to read data previously stored to Track 0.

Any desired number of additional adjacent tracks can be overlapped, or trimmed, in this manner by continually displacing the head 120 unidirectionally across the medium 108. For example, by placing the write element 178 in a centered relationship over track centerline 184 Track 2 can be written while trimming Track 1. By subsequently placing the write element 178 in a centered relationship over track centerline 186 Track 3 is written while trimming Track 2. In this manner the track density is increased because the track width is determined by the width of the relatively narrower read element 176 rather than the write element 178.

Clearly, however, the overlapping arrangement of the data storage tracks makes updating data relatively problematic in comparison to non-overlapping tracks. For example, updating data previously stored on Track 1 will also overwrite data stored on the overlapping Track 2. Accordingly, in order to update data on Track 1 it will likely be necessary to first read and buffer the contents of all downstream overlapping tracks, in this case Track 2 and Track 3, and then write the new data to Track 1 and rewrite the buffered data from Track 2 and Track 3.

For this reason it is advantageous to group the overlapping data tracks into discrete bands of a selected number of overlapping tracks and terminating with a non-overlapping track serving as a guard track. Track 4 in FIG. 3, for instance, abuttingly engages Track 3 rather than overlapping it so that writing to Track 4 will not trim previously stored data in Track 3.

While the overlapping of adjacent tracks must be done unidirectionally, it can be done either from an inner radius of the medium 108 toward the outer radius or vice versa. For purposes of this description and meaning of the appended claims the term "downstream" means a relative direction of the head 120 movement in trimming previously written tracks by writing subsequent tracks.

Figure 5:
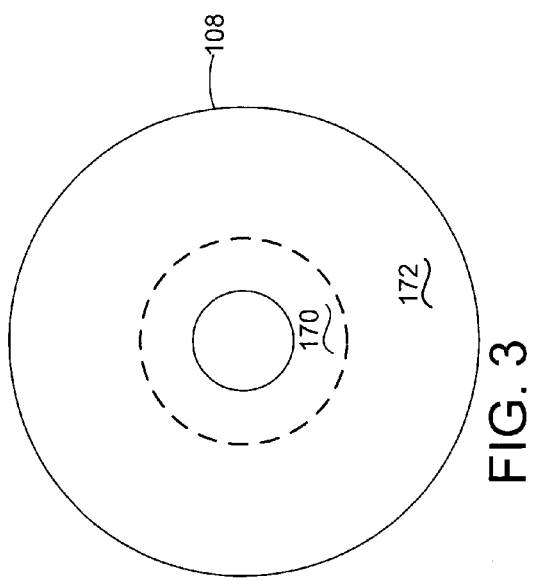
FIG. 5 is a diagrammatic view of a number of bands of overlapping data storage tracks separated by guard bands of the data storage medium of FIG. 3.

FIG. 5 illustrates a manner in which the overlapping tracks are grouped into bands 190 of tracks that are separated by one or more non-overlapping track(s) providing guard regions 192 between adjacent bands 190. The number of overlapping tracks in each band 190, and hence the storage capacity of each band 190, can be selected so as to optimize the performance of data stored and updated therein. For example, where sound recordings are likely to be stored in an appreciable number, the size of the bands 190 might advantageously be made sufficient to accommodate a typical MP3 file, such as about 5 MB.

As mentioned above, utilizing bands 190 of overlapping tracks is advantageous for sequentially accessing relatively long streams of data in a high density format. However, updating data previously stored in this manner typically creates discontinuities in the data storage scheme, or "fragmentation" of the stored data.

For best illustrating this fragmentation FIG. 6 is another diagrammatic representation of the five data tracks of FIG. 4. Differences in the effective widths are not shown in FIG. 5, but the overlapping relationship remains such that writing to a downstream track also overwrites data on the track immediately upstream of it. It will also be noted that although shown as linear tracks, the tracks are actually curvilinear such that the head 120 upon traversing one track completely to the right-hand side thereof immediately thereafter embarks upon the left-hand side of the next downstream track in sequentially traversing across the band 190 of tracks.

A first data transfer command to store data to the band 190 will preferably begin at the first available LBA of the block 190 and sequentially allocate enough LBAs thereafter to satisfy the requirements of the store command. In this case, since no data previously existed in the block 190, the beginning LBA is the beginning of the block 190. FIG. 6 shows that the entirety of Track 0, Track 1, and Track 2 has been allocated for the first data transfer command. A "hole" in the allocated storage space can be created when previously stored data is updated. FIG. 7, for example, illustrates the case whereby a portion of the data stored in Track 1 is updated. As discussed above, writing data to Track 1 simultaneously overwrites the adjacent data in Track 2. Accordingly, before the data in Track 1 is updated, the data in Track 2 is read and buffered, then subsequently safely written to the next unallocated and non-overlapping track, such as Track 3 in this case. This results in Track 2 becoming a fragmented portion within the block 190 because now, with the downstream Track 3 allocated, any writes to Track 2 will adversely overwrite data stored in Track 3.

Accordingly, "scrubbing" is a data integrity operation performed on continuous data stored in overlapping tracks to maintain the stored data in an optimal arrangement by gathering fragmented portions together in contiguous sets, and thereby returning the data to a sequentially-arranged data set to the greatest extent possible. FIG. 8 is illustrative of the state of the block 190 after a scrubbing operation has been conducted to read and buffer, then rewrite the data stored in Track 3 to Track 2 so that there exists again continuity in the allocated storage from the beginning LBA to the last LBA of the stored data. It will be noted that even though the writing to Track 2 creates holes in the downstream Track 3, Track 3 nevertheless remains ready for writing without the need for a DC erase, as subsequent writings can be performed in relation to the present magnetization of the storage space.

These examples of different types of data integrity operations are illustrative of, and not limiting to, the embodiments contemplated herein whereby the controller 148 is responsive to where the stored data resides in determining which of the plurality of different data integrity operations to execute. For example, based on deterministic factors, a host 144 command for data integrity operations on reliability-critical data, because of its location in the normal data partition 170, will result in the controller 148 executing an appropriate routine, such as SMART or DST routines. Alternatively, a host 144 command for data integrity operations on time-critical data, because of its location in the A/V data partition 172, will result in the controller executing a different routine, such as a scrubbing routine. In yet other equivalent alternative embodiments the host 144 and data storage device 100 are configured such that within time-critical data region, whether within a partitioned environment or not, the data transfer commands from the host result in always writing monotonically. Such a system would advantageously eliminate the need for scrubbing operations for data integrity. In any event, preferably the data integrity operations are scheduled for execution during idle times between the executions of consecutive host commands in order to operate in the background with respect to host 144 processing control.

Figure 9:
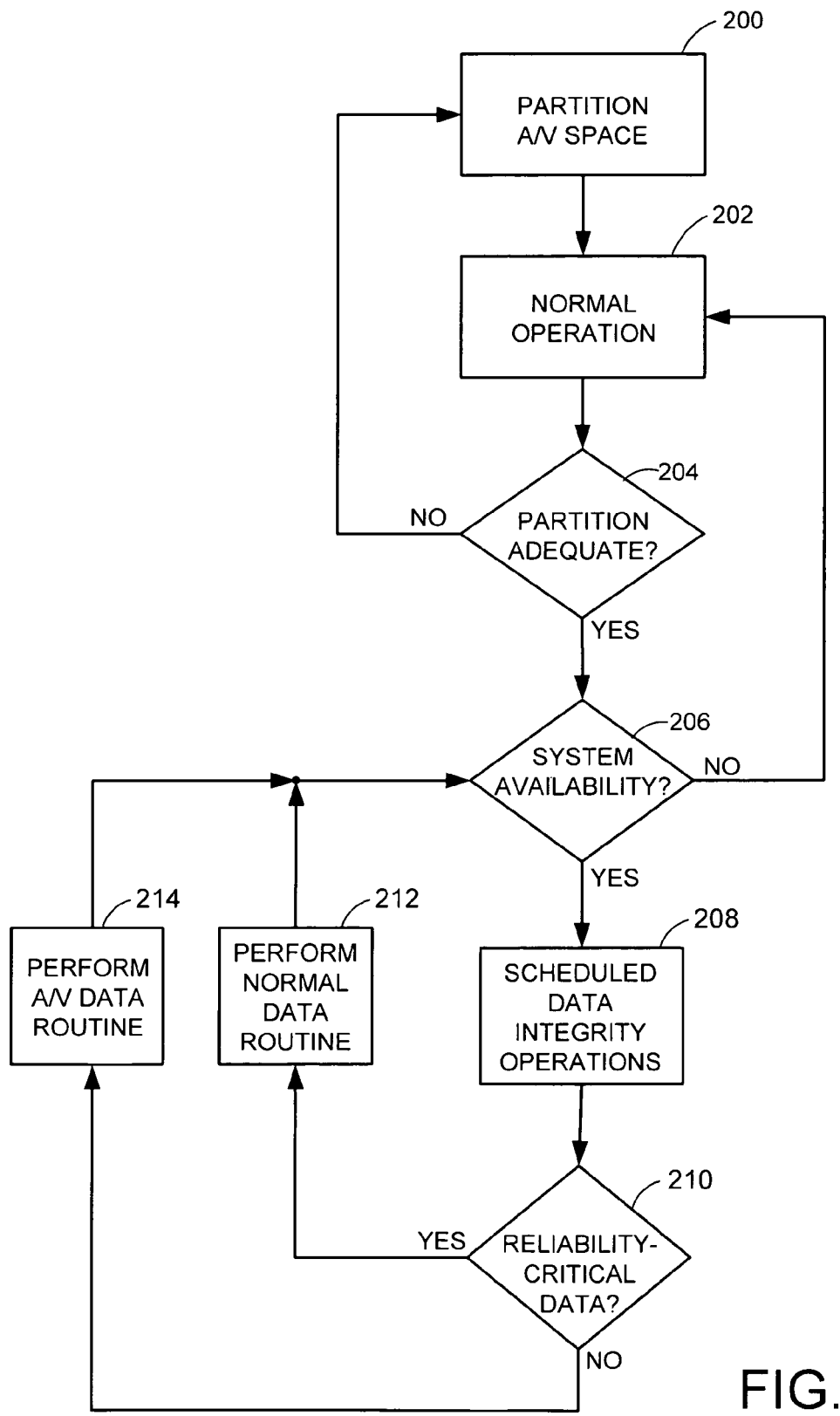
FIG. 9 is a flowchart of steps for performing a method of managing background operations of the data storage device of FIG. 1.

FIG. 9 is a flowchart illustrating steps for practicing a method of managing background operations of a data storage space based on how the host 144 accesses the data in the storage space. In block 200 the host 144 partitions the storage space, such as the remote data storage device 100, into first and second partitions for storing reliability-critical and time-critical data, respectively. As discussed above, partitioning the data storage space into the plurality of data-type partitions makes the type of data being accessed identifiable to the controller 148, which can then perform one of a plurality of different data integrity operations on stored data in relation to which partition of the plurality of partitions the stored data is in. Normal host-based processing operations then proceed in block 202 in order to carry out data access commands storing data to and retrieving data from the data storage device 100.

Decision block 204 determines whether the existing partitioning scheme is adequate for the observed storage requirements of the data storage device 100. If, for example, the host 144 encounters an unexpectedly high utilization of the A/V data partition and a correspondingly low utilization of the normal data partition, then it is contemplated that the host 144 can return to block 200 to dynamically re-partition the storage space of the data storage device 100 in accordance with the observed storage requirements.

Otherwise, in block 206 the host 144 determines whether an interval of system availability exists during which the data storage device 100 can be made free to execute background operations independently of the host processing commands. If no, then control returns to normal operations at block 202. Otherwise, the host 144 queries scheduled data integrity operations in block 208, such as in terms of both priority to continuation of processing capability and/or the overhead necessary to carry out the data integrity operations. The type of data on which the selected data integrity operation is to be performed is determined in block 210, such as in relation to the LBA of the data with respect to the plurality of partitions 170, 172. If the affected data is reliability-critical data then an appropriate data integrity operation, such as a SMART or DST routine, is executed by the controller 148 in block 212 (sometimes referred to herein as a data verification operation). Otherwise, a time-critical data routine, such as scrubbing, is executed by the controller 148 in block 214 (sometimes referred to herein as a defragmentation operation). In either event, control then returns to determination block 206 for more scheduled data integrity operations in block 208 or back to normal host-based processing in block 202.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the devices in which they are incorporated or the particular environment in which they are used without departing from the spirit and scope of the present invention.

In addition, although the illustrative embodiments described herein are directed to a data storage system, it will be appreciated by those skilled in the art that the claimed subject matter is not so limited and various other electronic devices can utilize the embodiments of the present invention without departing from the spirit and scope of the claimed invention.

What is claimed is:

1. An apparatus comprising circuitry configured to select a data integrity operation for stored data from a plurality of different data integrity operations based on a predetermined correlation that makes where the stored data resides determinative of whether the selected data integrity operation is a data verification operation or a data defragmentation operation.

2. The apparatus of claim 1 wherein the circuitry is responsive to which of a plurality of partitions contains the stored data in determining which of the plurality of different data integrity operations to execute.

3. The apparatus of claim 2 wherein the circuitry executes a first data integrity operation of the plurality of different operations associated with verifying reliability-critical data stored in a first partition of the plurality of partitions.

4. The apparatus of claim 3 wherein the circuitry executes a second data integrity operation different than the first data integrity operation associated with defragmenting time-critical data stored in a second partition of the plurality of partitions.

5. The apparatus of claim 4 wherein the circuitry executes the second data integrity operation on data stored in overlapping data tracks in the second partition.

6. The apparatus of claim 4 wherein the circuitry executes the first and second data integrity operations in the background with respect to data access commands received from a remote device.

* * * * *